United States Patent
Helin

(10) Patent No.: US 6,740,537 B2
(45) Date of Patent: May 25, 2004

(54) PROCESS FOR FABRICATING A MICROELECTROMECHANICAL OPTICAL COMPONENT

(75) Inventor: Philippe Helin, Grenoble (FR)

(73) Assignee: MEMSCAP (FR)

( * ) Notice: Subject to any disclaimer, the term of this patent is extended or adjusted under 35 U.S.C. 154(b) by 63 days.

(21) Appl. No.: 10/205,724

(22) Filed: Jul. 26, 2002

(65) Prior Publication Data

US 2003/0027370 A1 Feb. 6, 2003

(30) Foreign Application Priority Data

Jul. 31, 2001 (FR) .............................. 01 10228

(51) Int. Cl.7 ..................... H01L 21/00; H01L 21/302; H01L 21/461; H01L 31/0232
(52) U.S. Cl. ............................. 438/31; 438/65; 438/69; 438/704; 257/432; 398/45; 398/142; 398/143; 359/223; 359/290
(58) Field of Search ................. 359/290, 223, 359/237, 291; 385/16–24; 310/309; 361/283.3; 318/116; 398/45, 55, 111, 139, 141–143, 156, 200, 212; 438/29, 31, 65, 69, 704, 734, 737, 738, 739, 749, 750–751; 257/432, 627, 619–620

(56) References Cited

U.S. PATENT DOCUMENTS

| 5,426,070 A | 6/1995 | Shaw et al. ................. 437/203 |
|---|---|---|
| 5,998,906 A | 12/1999 | Jerman et al. ............... 310/309 |
| 6,020,272 A | 2/2000 | Fleming ..................... 438/734 |
| 6,150,275 A | 11/2000 | Cho et al. ................... 438/696 |
| 6,229,640 B1 | 5/2001 | Zhang ........................ 359/290 |

FOREIGN PATENT DOCUMENTS

WO    WO 98/12589    3/1998

*Primary Examiner*—William David Coleman
*Assistant Examiner*—Neal Berezny
(74) *Attorney, Agent, or Firm*—Heslin Rothenberg Farley & Mesiti P.C.

(57) ABSTRACT

A process for fabricating a microelectromechanical optical component from a silicon substrate is disclosed. The component comprises optical propagation guides; a wall which can move with respect to the propagation guides; and an electrostatic actuator associated with return means formed by at least one beam capable of causing the moving wall to move with respect to the rest of the substrate. The substrate is single-crystal silicon having (111) crystallographic planes parallel to the plane of the substrate. The process comprises a first series of deep reactive ion etching steps during which the heights of the moving wall, of the electrodes of the actuator, and of the beams of the return means of the actuator are defined with different values, and a second wet etching step, making it possible to free the moving wall, the electrodes and the beams from the rest of the substrate.

6 Claims, 8 Drawing Sheets

PROCESS FOR FABRICATING A MICROELECTROMECHANICAL OPTICAL COMPONENT

CROSS REFERENCE TO RELATED APPLICATIONS

This application claims the priority of French patent application 01.10228 filed Jul. 31, 2001. The entire disclosure thereof is incorporated herein by reference.

TECHNICAL FIELD

The invention relates to the field of microelectromechanical components also called MEMS standing for Microelectromechanical Systems. It relates more particularly to MEMS components used in fibre-optic communication devices. The invention relates more specifically to a process for fabricating microelectromechanical components which make it possible to optimize their performance and their manufacturing cost. This process may serve for fabricating various types of optical components which include a moving member moving under the effect of a control command. There may be optical switches, obturators or variable attenuators.

In the rest of the description, the invention will be more particularly described in respect of an optical switch, but it could easily be transposable to an optical obturator or attenuator.

PRIOR ART

In general, an optical switch receives at least one input optical fibre and at least two output optical fibres. These optical fibres are placed in optical propagation guides oriented very precisely with respect to one another, most generally at 90° with respect to one another. The optical switch comprises a mirror which can move in order to intercept the beams propagating in propagation guides. When the moving mirror is in a first position, it allows reflection of the optical beam output by an optical fibre towards a second fibre. When this mirror is in a second position, it does not modify the propagation of the beam output by the first optical fibre, which is therefore transmitted in the optical fibre located in alignment with it.

The movement of this mirror takes place by means of an actuator. Various types of actuators have already been proposed and especially electrostatic actuators, such as in particular that described in document U.S. Pat. No 6,229,640. This type of electrostatic actuator comprises a number of electrodes distributed in two interdigitated combs. These two interdigitated combs partially penetrate one another to form a capacitor thanks to their facing surfaces. Application of an electrical voltage between the two interdigitated combs causes a relative movement of one comb with respect to the other.

Since the mirror is fastened to one of the two combs of electrodes, it moves under the action of this voltage. Positional return takes place when the electrical voltage disappears, owing to the effect of return means which generally consist of one or a number of beams which connect the comb of moving electrodes to the rest of the substrate.

One of the objectives of the invention is to allow the mirror to move using an electrical voltage of a relatively limited value, while obtaining a sufficient excursion of the mirror. However, the use of a voltage of low value causes the facing surface area of the two combs of electrodes to increase.

Moreover, to obtain a movement of the greatest possible amplitude, it is important that the return means do not exert too large a force and that their stiffness be therefore relatively limited. However, this stiffness is determined inter alia by the thickness of the beams which constitute it. Therefore to increase the travel of the mirror, it is tempting to reduce the thickness of the beams of the return means of the actuator.

A problem then arises when it is desired to combine the two aforementioned effects, namely, on the one hand, an increase in the surface area of the electrodes and, on the other hand, a reduction in the thickness of the beams of the return means.

This kind of inconvenience is observed in the microcomponents produced on SOI (Silicon On Insulator)-based substrates. This is because, on SOI substrates, the definition of the electrodes and of the return means of the actuator is produced by etching down to the oxide layer. The electrodes and the return means are then freed by subsequent etching, carried out after the oxide layer has been etched. In this type of component produced from an SOI substrate, the beams of the return means and the electrodes therefore have the same height. To increase the force exerted by the actuator, it is therefore necessary to increase the number of electrodes, which results in a greater consumption of energy by the actuator and a greater occupation of the surface area of the substrate.

It has also been proposed to produce optical switches from a single-crystal silicon substrate, these also being called "bulk" switches. Various processes have been developed which depend on the crystallographic orientation of the substrate used. Thus, when the substrate used has an upper face parallel to the (100) plane of the silicon crystal structure, it is possible to carry out, in the same operation, etching of the mirror and of the propagation guides. This is because, thanks to the orientation of the crystal planes which form stop planes for the chemical etching, it is possible to obtain perfect alignment of the propagation guides lying along the same axis, and perfect perpendicularity of the orthogonal propagation guides. However, the thickness of the mirror obtained by this chemical etching depends on the etching time. The precision on the thickness of this mirror is therefore subject to the variations in the conditions under which the etching is carried out. Thus, a slight temperature drift may introduce considerable inaccuracy in the thickness of the mirror.

Wet etching operations are also carried out using substrates whose upper face is parallel to the (110) plane of the silicon crystallographic structure. In this case, the chemical etching stop planes correspond to the vertical sidewalls of the mirror, thereby making it possible to achieve very good precision on the thickness of the mirror.

However, in this situation, it is necessary to produce the propagation guides in a second phase, since the crystallographic axes do not coincide with the directions of these propagation guides. It is therefore necessary to produce them by a subsequent step, generally requiring the use of dry etching, of the reactive ion etching or RIE type.

One of the objectives of the invention is therefore to allow optical components to be produced from single-crystal silicon with a minimum number of steps.

Document U.S. Pat. No. 6,150,275 has described a process for producing microstructures from single-crystal silicon, the (111) crystallographic planes of which are parallel to the principal plane of the substrate. The process described in that document consists in linking dry etching steps for defining the contours of a microstructure on the substrate. This process is continued by a chemical etching step which makes it possible to free the structure predefined by the dry etching.

SUMMARY OF THE INVENTION

The invention therefore relates to a process for fabricating a microelectromechanical optical component which is produced from a silicon substrate. Such an optical component generally comprises:

- at least two optical propagation guides, especially intended to receive optical fibres;
- a wall which can move with respect to the propagation guide;
- an electrostatic actuator capable of causing the moving wall to move with respect to the rest of the substrate, the said actuator comprising:
   - facing electrodes which can move with respect to each other, some of the electrodes being mechanically linked to the moving wall, the other electrodes being fastened to the rest of the substrate;
   - return means formed by at least one beam produced in the substrate and opposing the movement of the electrodes with respect to one another.

In accordance with the invention, the substrate used is made of single-crystal silicon, the (111) planes of which are parallel to the planes of the substrate. This process firstly comprises a first series of deep reactive ion etching steps during which the heights of the moving wall, of the electrodes of the actuator, and of the beams of the return means of the actuator are defined with different values. This process continues with a second wet etching step, making it possible to free the moving wall, the electrodes and the beams of the actuator from the rest of the substrate.

In other words, it is possible to produce a mirror having a height substantially greater than the height of the electrodes and of the beams of the return means of the actuator. It is thus possible to optimize the ratio of the various heights of the members of the component. Thus, the electrode etching height will be chosen to be greater than that of the beams of the return means. In this way, the height of the electrodes, and therefore the force which is exerted between the two sets of electrodes, is increased for the same control voltage. At the same time, by reducing the thickness of the beams of the return means, the stiffness of the latter is reduced, thereby making it possible to increase the excursion of the mirror. This possibility is provided by differentiated deep reactive ion etchings whereby the contours of the electrodes or of the walls of the return means are defined.

The depth of the deep reactive ion etching used to define the mirror may be chosen in various ways. Thus, this depth may be chosen so that the optical fibre can be completely included within the propagation guide, thereby facilitating the subsequent encapsulation phases.

The depth of this first etching may also be less, provided that it is sufficient to ensure interception by the mirror of the beam output by the optical fibres. In this case, since the reflecting region of the mirror lies close to the upper face of the substrate, it exhibits better planarity and verticality, and therefore better reflecting properties.

In practice, before the deep reactive ion etching steps, a masking step for defining the subsequent position of the optical propagation guides of the moving wall, of the electrodes and of the return means of the actuator is carried out. The masking may for example take place by depositing an $SiO_2$ layer, for example by PECVD (Plasma Enhanced Chemical Vapour Deposition) techniques. This layer is then configured by a conventional method consisting of lithography followed by etching.

Advantageously in practice, the process comprises two successive deep reactive etching steps, namely:

- a first deep reactive ion etching step during which the heights of the moving wall, of the electrodes and of the return means of the actuator are defined; and
- a second deep reactive ion etching step during which the volumes from which the subsequent wet etching step may be initiated are defined.

In practice, between these two deep reactive ion etching steps, the following are carried out:

- firstly, conformal deposition of an $SiO_2$ layer in the regions etched by the first etching step; and
- then removal of this $SiO_2$ layer from the bottom of the initially etched regions.

The term "conformal" deposition is understood to mean that the deposition is carried out over the entire visible surface of the substrate, with a constant thickness.

It is in the bottom of these regions that the subsequent step of reactive ion etching will take place, allowing the volumes from which the wet etching step can start to be defined.

After the wet etching step, a metallization step is carried out, which allows the moving wall to be made reflecting. This step also allows the electrodes to be metallized, thereby allowing the control voltage to be applied.

According to another characteristic of the invention, during the deep reactive ion etching steps, a number of small protection beams, located on either side of the beams forming part of the return means of the actuator, are defined. These small protection beams are joined to the beams of the return means via linking portions of small dimensions. These small protection beams are then freed from the rest of the substrate during the wet etching step. These small protection beams, lying on each side of the beams of the return means, allow the loading effects during deep etching of the substrate to be increased.

This is because, to obtain a sufficient excursion of the mirror, it is necessary for the return means to deform relatively substantially. Certain parts of the beams of the return means therefore move by a distance approximately equivalent to that travelled by the mirror.

The beams of the return means therefore lie in the widely open spaces. However, it is known that the depth of deep reactive ion etching depends on the surface area of the etched features. Features of smaller surface area are etched less deeply than features of larger dimensions. This phenomenon, known by the name "load effect", is used when defining the beams of the return means in order to make two factors which seem a priori contradictory compatible, these being, on the one hand, the desired precision on the dimensions of the beams of the return means and, on the other hand, the width of the opening in which these beams are located.

This is because the cross section of the beams of the return means is a dominant parameter in determining the stiffness of these return means. To obtain a precise stiffness, it is therefore necessary to control the cross section of these beams of the return means. To do this, the precise contour of the beams of the return means is defined by features of very small width. Outside these features, the small protection beams, which will be more exposed to the deep reactive ion etching in the relatively open space which surrounds the beams of the return means, are produced. The load effect phenomena during deep reactive ion etching therefore are observed in the narrow features separating the beams of the return means from the small protection beams.

The reactive ion etching depth will be different on the two sides of the small protection beams. Thus, on that side of the small protection beams facing the open space in which the return means will move, the etching will be relatively deep. On the other hand, on that side of the small protection beams facing the beams of the return means, this etching will be substantially shallower, so as to produce a beam of small thickness, and therefore having a more controlled and therefore optimized stiffness. The use of small protection beams therefore makes it possible to create an additional etching depth level and to control the cross section and therefore the stiffness of the beams of the return means.

Since the small protection beams are joined to the beam of the return means by linking regions of very small dimensions, they play virtually no part in determining the stiffness of the beam of the return means, but act as weights distributed over the length of this beam.

The process according to the invention can be employed for obtaining various types of optical components. These may be components of the variable attenuator or obturator type, which possess two collinear optical propagation guides.

There may also be components of the switch type incorporating two pairs of collinear propagation guides, one pair being perpendicular to the other. In this case, the mirror moves in a plane at 45° with respect to the propagation guide.

By optimizing the compromise between the stiffness of the return means and the volume of electrodes, an actuator of substantially smaller size than that of the prior art is obtained. It is therefore possible to bring the optical propagation guides closer together in a manner sufficient to produce multiple switches based on elementary cells in the form of matrices, by increasing the concentration and the integration density of the elementary switching cells.

BRIEF DESCRIPTION OF THE FIGURES

The manner in which the invention is carried out and the advantages which stem therefrom will become clearly apparent from the description of the embodiment which follows, supported by the appended figures in which.

MANNER OF REALIZING THE INVENTION

As already mentioned, the invention relates to a process for fabricating an optical microcomponent which may be of various types. It may, for example, be a switch, as in the embodiments illustrated, but also a variable attenuator or obturator.

Figure 1:
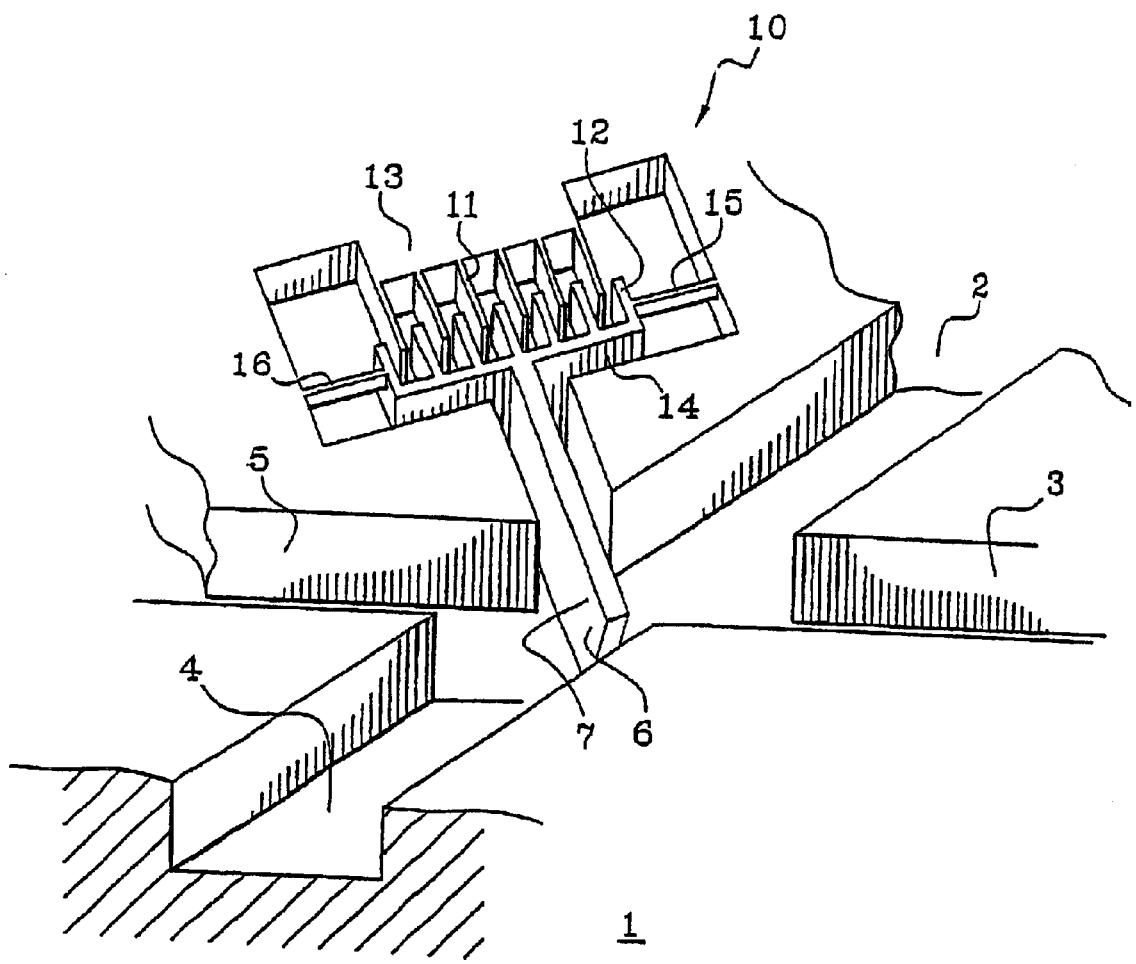
FIG. 1 is a summary perspective view of the principal region of an optical switch produced in accordance with the invention.

In general, an optical switch (1), as illustrated in FIG. 1, comprises four optical propagation guides (2, 3, 4, 5). These four propagation guides (2–5) are grouped in pairs of collinear guides. Thus, the two guides (2, 4) are in alignment with each other, just as are the guides of the other pair (3, 5). These two pairs of guides (2–5) are perpendicular to each other. These propagation guides (2–5) are intended to house optical fibres (not shown in FIG. 1), allowing a signal in the form of a light beam to be transmitted.

These propagation guides (2–5) may also house collimation members for focussing the beams output by the optical fibres.

Essentially, the optical switch (1) also includes a moving wall (6) forming a mirror, the face (7) of which is reflecting, in order to allow the beam travelling in the input guide (4) to be reflected into the output guide (5). This mirror (6) is capable of moving parallel to the principal plane of the substrate and in a direction making an angle of 45° with the directions of the guides. This 45° orientation, although it is not absolutely necessary, nevertheless constitutes an optimum in terms of crosstalk, reflection quality and silicon surface occupation.

The mirror (6) is moved by an actuator (10). This actuator comprises a plurality of electrodes (11, 12) grouped together as two interdigitated combs. Thus, some of the electrodes (11) are fastened to the rest of the substrate, and form plates oriented perpendicular to the principal plane of the substrate. The actuator also includes moving electrodes (12), also arranged in the form of a comb of plates perpendicular to the plane of the substrate. These electrodes (12) are inserted between the electrodes (11) of the fixed comb. The facing surfaces of the electrodes (11, 12) of the fixed and moving combs constitute a capacitor. Applying a voltage between the electrodes (11, 12) makes it possible to generate an electrostatic-type force causing the moving comb (14) to move with respect to the fixed comb (13).

The movement of the moving comb (14) with respect to the comb (13) is opposed by the presence of return means consisting of two beams (15, 16) joining the moving comb (14) to the rest of the substrate. These beams (15, 16) undergo deformations due to the effect of the aforementioned electrostatic force and bring the moving comb (14) back into its rest position when this electrostatic force has disappeared. The beams (15, 16) illustrated in FIG. 1 are particularly simplified with respect to reality, for the sole purpose of making the drawings easier to understand. Of course, the invention covers many alternative embodiments of the return means in which the amplitude of movement is substantially greater than that which could be obtained by the beams illustrated in FIG. 1.

In general, the process according to the invention is not limited to production of switches as illustrated in FIG. 1, the structure of which is given merely as an example. The process according to the invention may on the contrary be applied to a very large number of different mechanical structures, provided that they employ the main members mentioned above, namely a moving wall forming a mirror, electrodes, some of which can move and the others are fixed, and return means formed from one or more beams.

Various geometries or designs may therefore be produced according to the invention.

The process according to the invention will be clearly understood from FIGS. 2a to 2h. Firstly, the substrate used must be based on single-crystal silicon, also called "bulk" silicon. A single-crystal silicon substrate is chosen in which the (111) crystal planes are parallel to the principal plane of the substrate (20). In a first step, the substrate (21) is covered with a layer (22) of silica $SiO_2$.

Figure 2A:
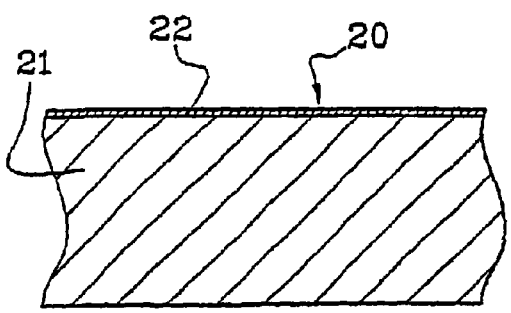
FIGS. 2a to 2h are cross-sectional views of regions in which elementary members of the structure of a microcomponent produced according to the invention are produced, and according to various successive steps of the process.
Figure 2B:
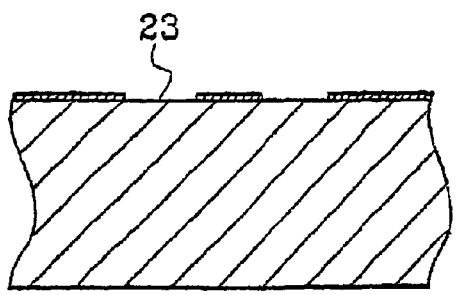
Figure 2C:
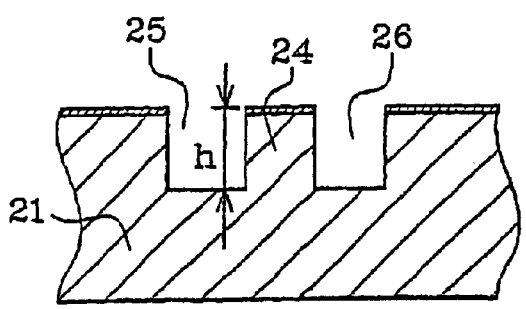

This layer is deposited by any known means, and especially by a process known as PECVD (Plasma Enhanced Chemical Vapour Deposition). This $SiO_2$ layer (22) serves as a mask for a DRIE (Deep Reactive Ion Etching) step referred to in the rest of the description as "deep etching". The features are defined on this $SiO_2$ layer (22) by conventional lithography and etching methods, as illustrated in FIG. 2b.

Figure 2D:
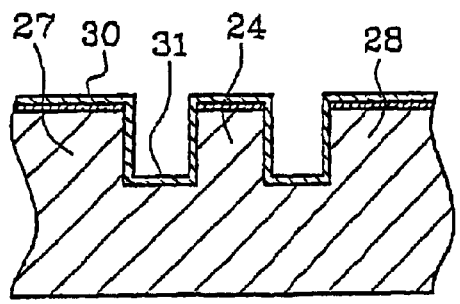
Figure 2E:
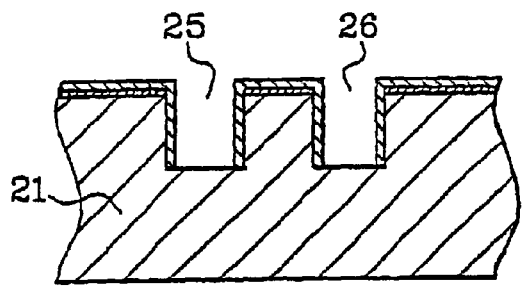

Next, the silicon substrate (21) undergoes a first deep etching step vertically below the features (23) produced on the $SiO_2$ layer. This step is used to define the height h of the portion (24) which will then be freed. The two regions (25, 26) are therefore etched to a depth corresponding to the height of the structure (24) to be freed. Thereafter, and as illustrated in FIG. 2d, a layer (30) of $SiO_2$ is deposited. This deposition is carried out conformally in order to cover the vertical side walls of the region (24) to be freed and of the adjacent regions (27, 28). This layer (30) serves to protect the silicon substrate during the subsequent anisotropic dry etching step illustrated in FIG. 2e. During this step, the $SiO_2$ conformal layer (30) is etched down to the level of the bottom (31) of the hollowed-out regions (25, 26). This etching step therefore reveals the substrate (21) at the bottom of these etched regions (25, 26).

Figure 2F:
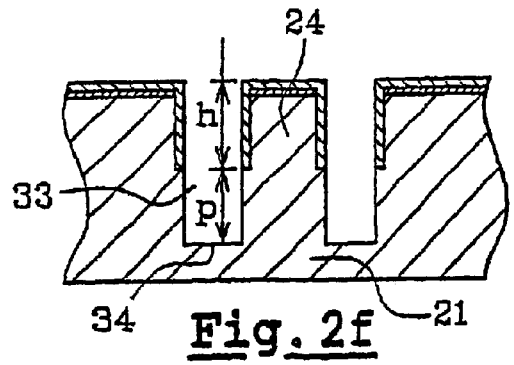

A second deep dry etching step is then carried out, as illustrated in FIG. 2f. This second deep etching is carried out to a depth p, which will define the distance between the structure (24) to be freed and the rest of the substrate (21). This depth p may be adjusted depending on the type of structure that may be obtained. Controlling this distance p makes it possible in particular to avoid the problems of bonding between the moving structures and the rest of the substrate.

Figure 2G:
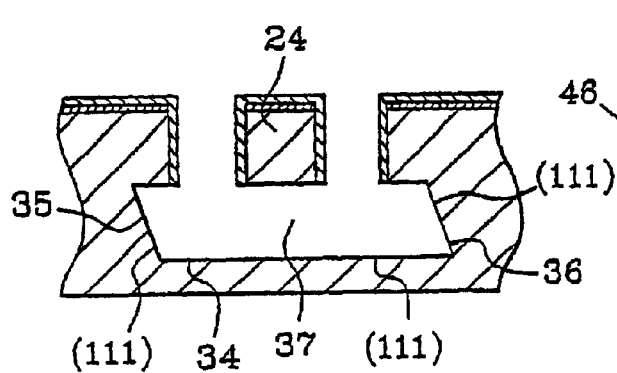
Figure 2H:
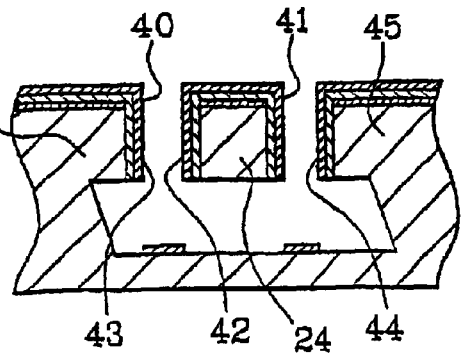

A wet anisotropic etching step is then carried out as illustrated in FIG. 2g. This wet etching is initiated from the region (33) which was etched by the second step of deep etching. The anisotropic etching may be of the sodium hydroxide (NaOH) or tetramethylammonium hydroxide (TMAH) or ethylenediamine pyrocatechol (EDP) type.

The choice of crystallographic orientation of the substrate is of very particular importance in this step of the process. This is because the families of (111) planes exhibit a very high selectivity compared to the other families of (100) or (110) planes in the case of the anisotropic etchings mentioned. The (111) planes therefore constitute stop planes for the etching. Since the bottom (34) of the region (33) etched beforehand is a plane of the (111) family, it will therefore undergo virtually no overetching. The underetching therefore takes place laterally. The underetching is limited by the planes (35, 36) which belong to the family of (111) planes. These planes form a hexagon in this crystallographic orientation with an angle of 19.4° between the horizontal planes (34) and the planes (35, 36) of the hexagon. This etching step is continued until the entire substrate is removed from beneath the region (24) to be freed.

This wet anisotropic etching step therefore defines an open region (37) lying beneath the structure (24) to be freed. Consequently, and as illustrated in FIGS. 2a–2h, the substrate sheath undergoes metallization. This metallization therefore allows a metal layer (40) to be deposited both on the upper face of the substrate but also on the side walls (41, 42) of the freed region (24), as well as on the facing side walls (43, 44) of the adjacent regions (45, 46).

This metallization provides the necessary reflecting power when the freed structure (24) serves as a mirror. When the freed structure (24) is used as an electrode in the electrostatic actuator, this metallization ensures equipotentiality of each comb.

Figure 3A:
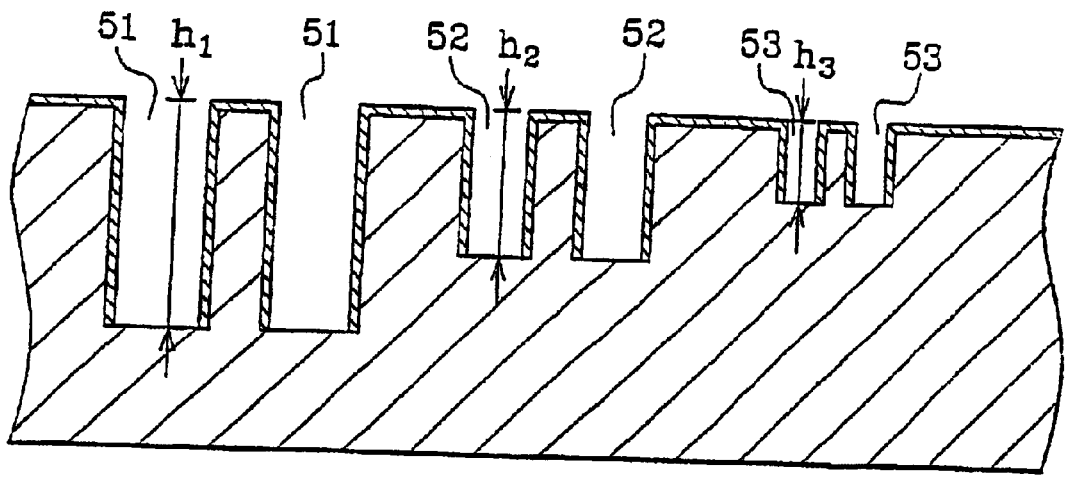
FIGS. 3a to 3c are cross-sectional views showing the production of three depth levels by etching, for example, the moving wall, the electrodes and the beams of the return means, as the production process advances.

The process according to the invention makes it possible to define various height levels as regards the moving structures inside the component. Thus, as illustrated in FIG. 3, the process described in detail in FIG. 2h may be employed by carrying out a first deep etching step with different etching levels thanks to the load effects. Thus, as illustrated in FIG. 3a, during the first deep etching step, regions (51, 52, 53) having depths $h_1$, $h_2$, $h_3$ which differ from one another are determined.

Figure 3B:
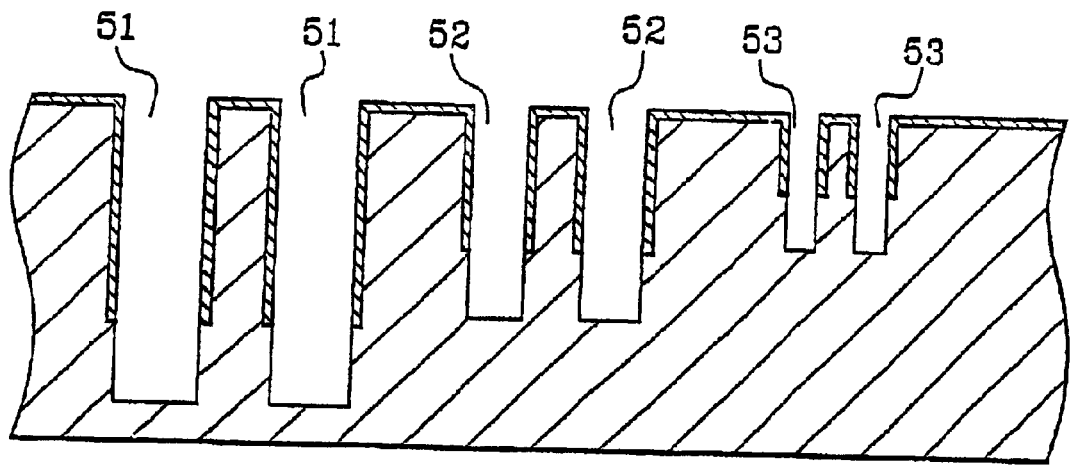
Figure 3C:
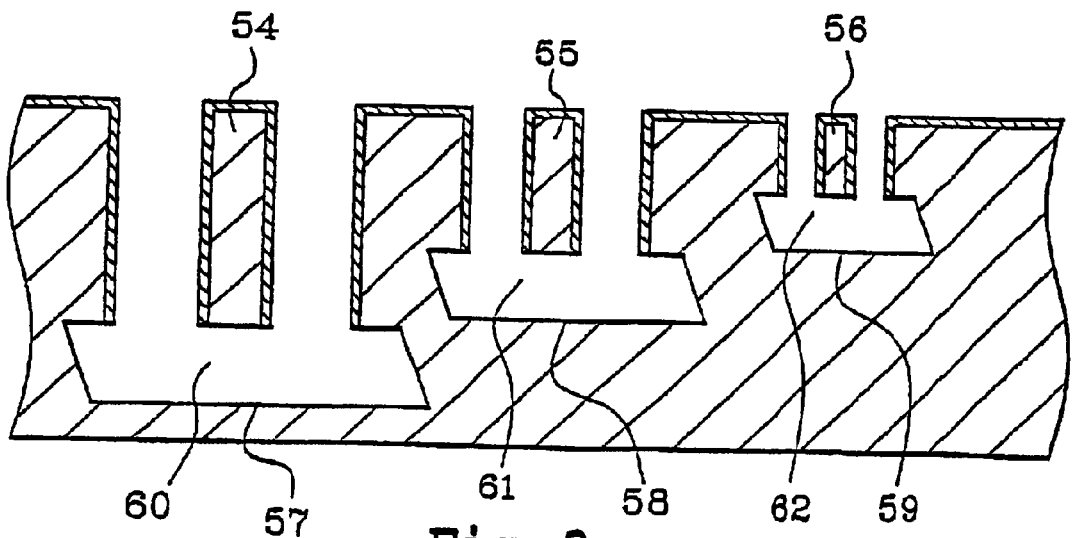

After conformal deposition of $SiO_2$ and anisotropic etching of the bottom of the regions (51–53), these not being shown, the process continues, as illustrated in FIG. 3b, with a second deep etching of the bottom of the regions (51–53) etched beforehand. This second deep etching step may take place to different depths depending on the type of structure to be produced. As already mentioned, this second deep etching step makes it possible to determine the distance which will separate the freed structures (54, 55, 56) from the bottom (57, 58, 59) of the cavity (60, 61, 62) which houses them.

Figure 4A:
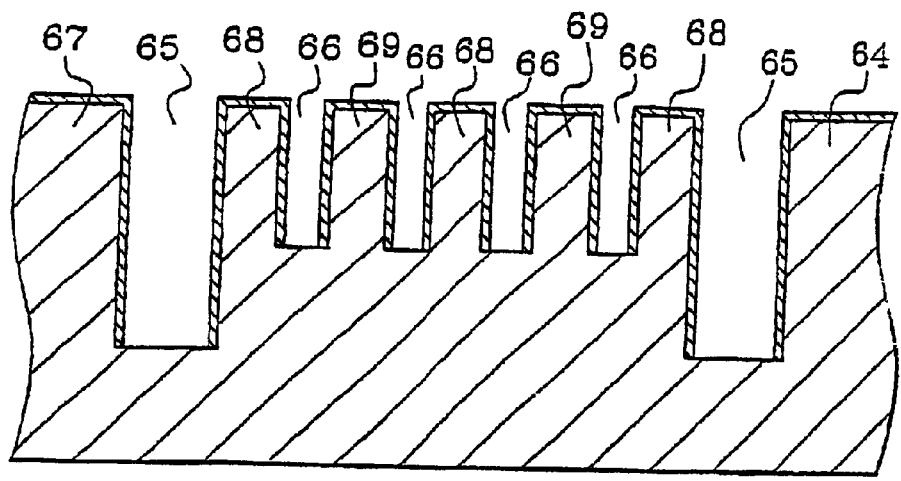
FIGS. 4 to 4b and 4c are cross-sectional views showing the various steps for producing the electrodes.
Figure 4B:
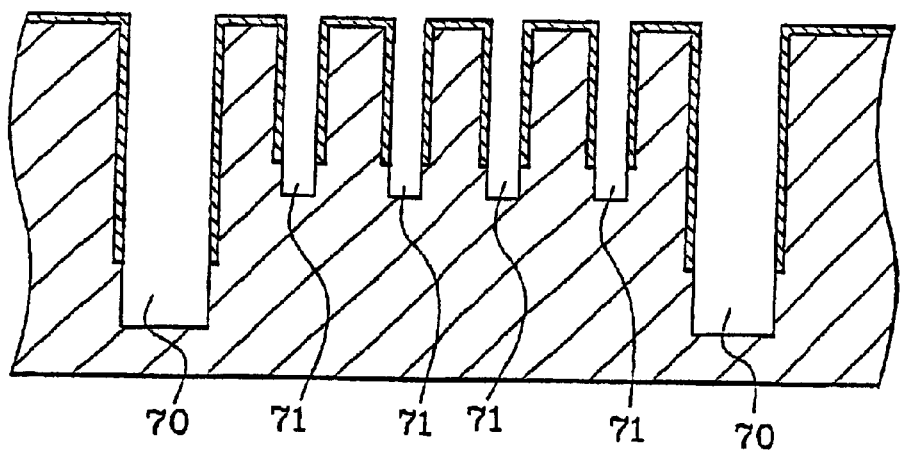
Figure 4C:
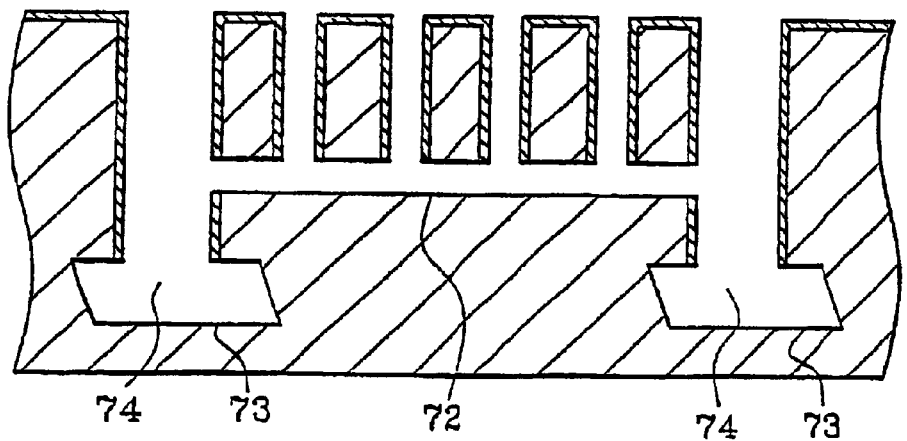

In the particular case of the formation of the electrodes illustrated in FIGS. 4a to 4c, a first etching step is carried out in order to form regions (65, 66) of different depths. The outer regions (65) are etched more deeply in order to allow thicker structures (67), outside the future electrodes (68, 69), to be defined.

During the second deep etching step illustrated in FIG. 4b, the regions (65, 66) are etched in order to define regions (70, 71) in which the subsequent wet etching step illustrated in FIG. 4c may be initiated. During this wet etching, the various regions (71) are enlarged in the plane of the substrate until they join up in order to free the various electrodes (68, 69) and to define a land (72) above which the electrodes (68, 69) will be located. This land (72) lies at a higher level than the bottom (73) of the recess (74) produced by wet etching of the regions (70) located laterally with respect to the electrodes (68, 69).

Figure 5:
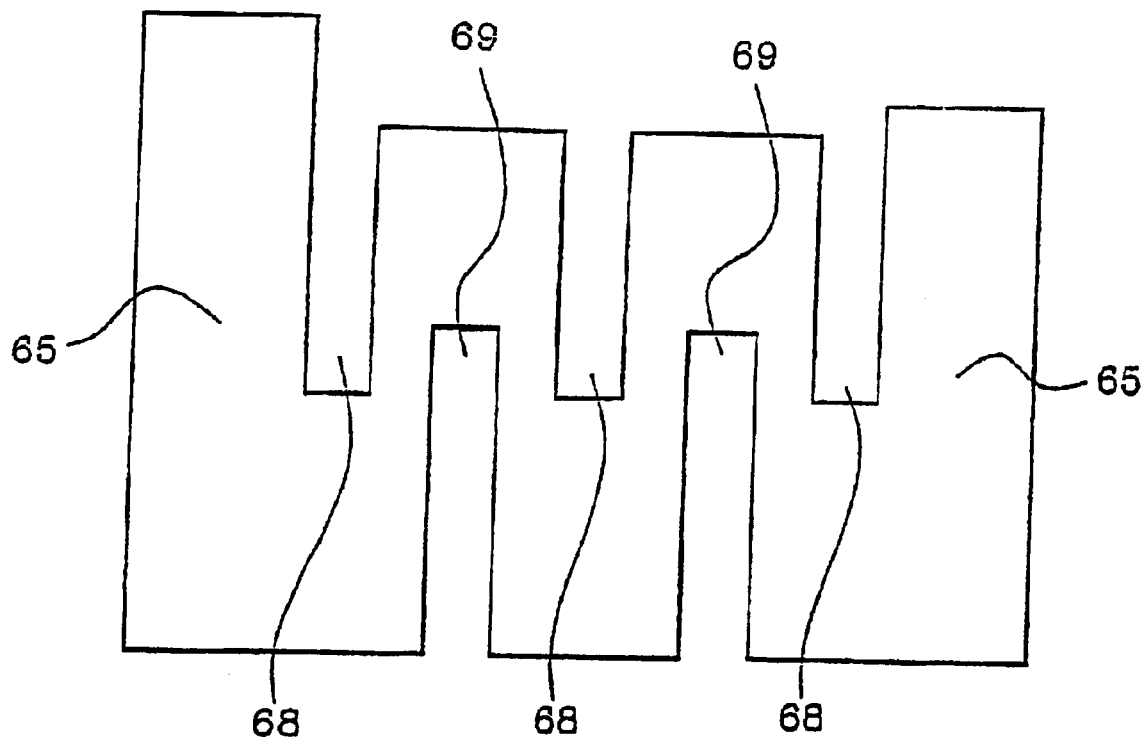
FIG. 5 is a top view of the region comprising the electrodes illustrated in FIGS. 4a and 4c.

In this way, as illustrated in FIG. 5, two interdigitated combs are produced, the electrodes (68, 69) of which are inserted into each other. Typically, the height of these combs is around 10 to 100 microns. For greater simplification, the number of electrodes described in FIGS. 4 and 5 is limited to 5, but their number may be adapted according to the structure of the actuator.

Figure 6A:
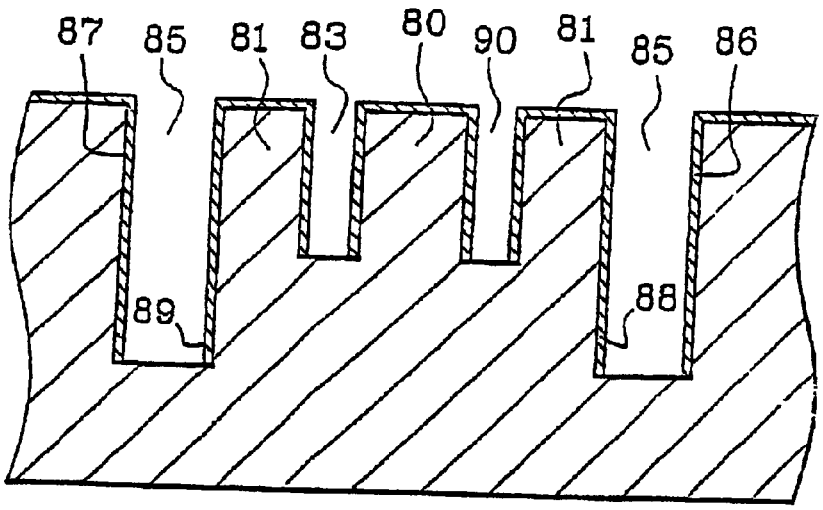
FIGS. 6a to 6c are cross-sectional views of the region of the beam of the return means, shown as the steps of the process according to the invention are carried out.
Figure 7:
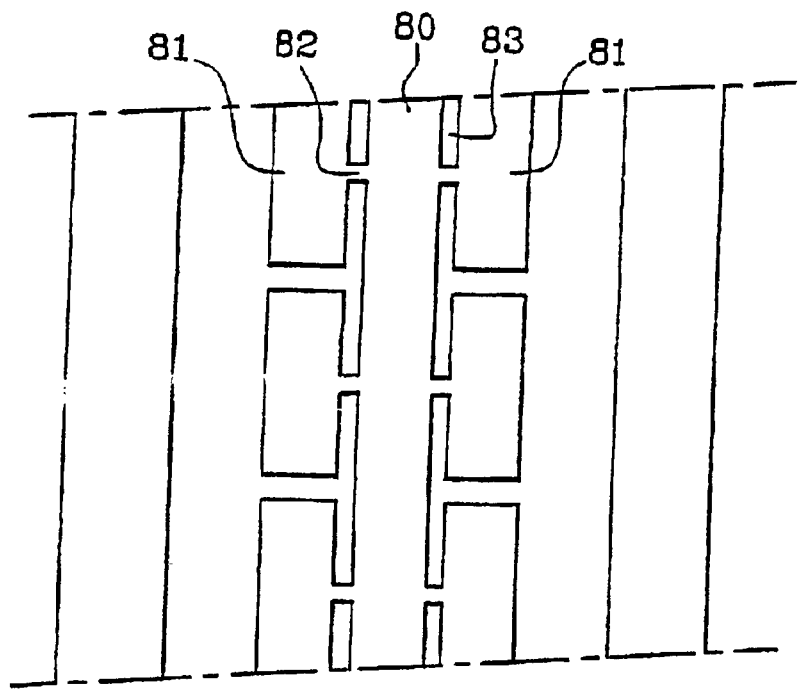
FIG. 7 is a partial top view of the region of the beam of the return means.

According to another characteristic of the invention, the process makes it possible to define the beams of the return means very precisely. Thus, as illustrated in FIG. 6a, a first deep etching step is carried out, which defines the beam (80) of the return means and two small lateral protection beams (81) located on each side of the beam (80). As illustrated in FIG. 7, the small protection beams (81) are joined to the beam (80) via linking regions (82) of very small dimensions. The etched regions (83) between the beam (80) and the small protection beams (81) are also small in size, typically around 3 to 10 microns.

The future beams and small protection beams (80, 81) are bounded laterally by regions (85) which are relatively wide. This is because the distance between the side walls (86, 87)

of these regions (85) corresponds to the space in which the return means are intended to move. This is therefore a distance of the same order as that of the movement of the mirror. The relatively small width of the regions (83) between the beam (80) and the small protection beams (81) therefore causes load effect phenomena.

Figure 6B:
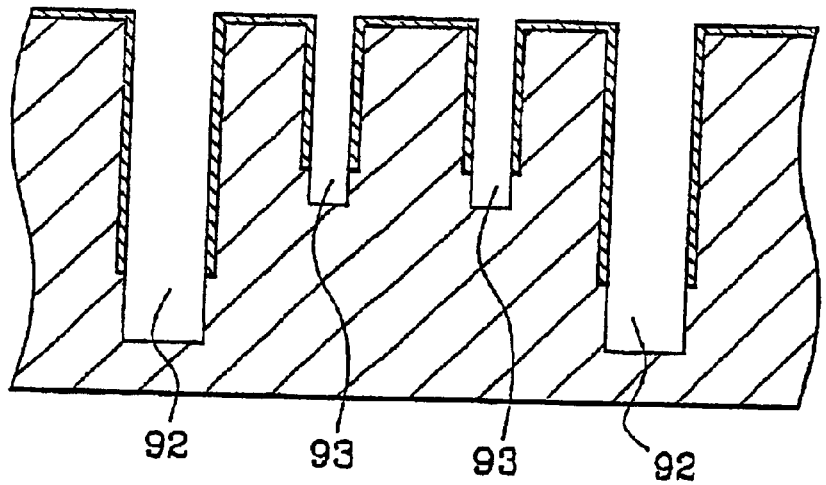
Figure 6C:
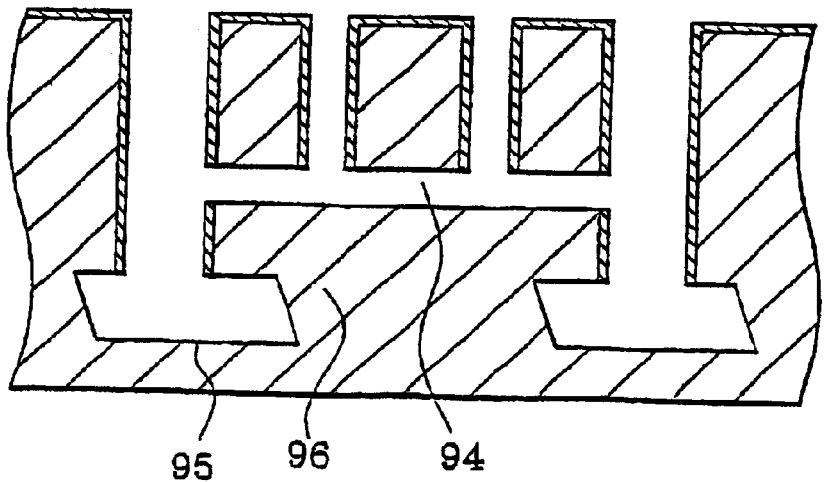

In the embodiment illustrated in FIG. 6, the relative dimensions of the regions (85) and (83) are substantially different from reality, only for the purpose of making certain characteristics of the process of the invention more easily understandable. In practice, the spaces (85) are much wider than those shown.

The side walls (90) predominantly determine the cross section of the beam (80), and therefore the stiffness characteristics, of the return means. This precision in the stiffness ensures good homogeneity of the performance of the various components produced using the same process.

Thus, after this first deep etching step, a second deep etching step is carried out, as illustrated in FIG. 6b, making it possible to define the regions (92, 93) in which the wet etching will be initiated. This wet etching takes place laterally beneath the beam (80) and the small protection beams (81), in order to define the region (94) above which the beam (80) and the small protection beams (81) are located.

The wet etching initiated from the lateral regions (92) defines the bottom (95) of the open spaces around the return means. To remove the $SiO_2$ layers joining the small protection beams (81) to the land (96), the entire $SiO_2$ layer may be removed and then the substrate oxidized.

Figure 8:
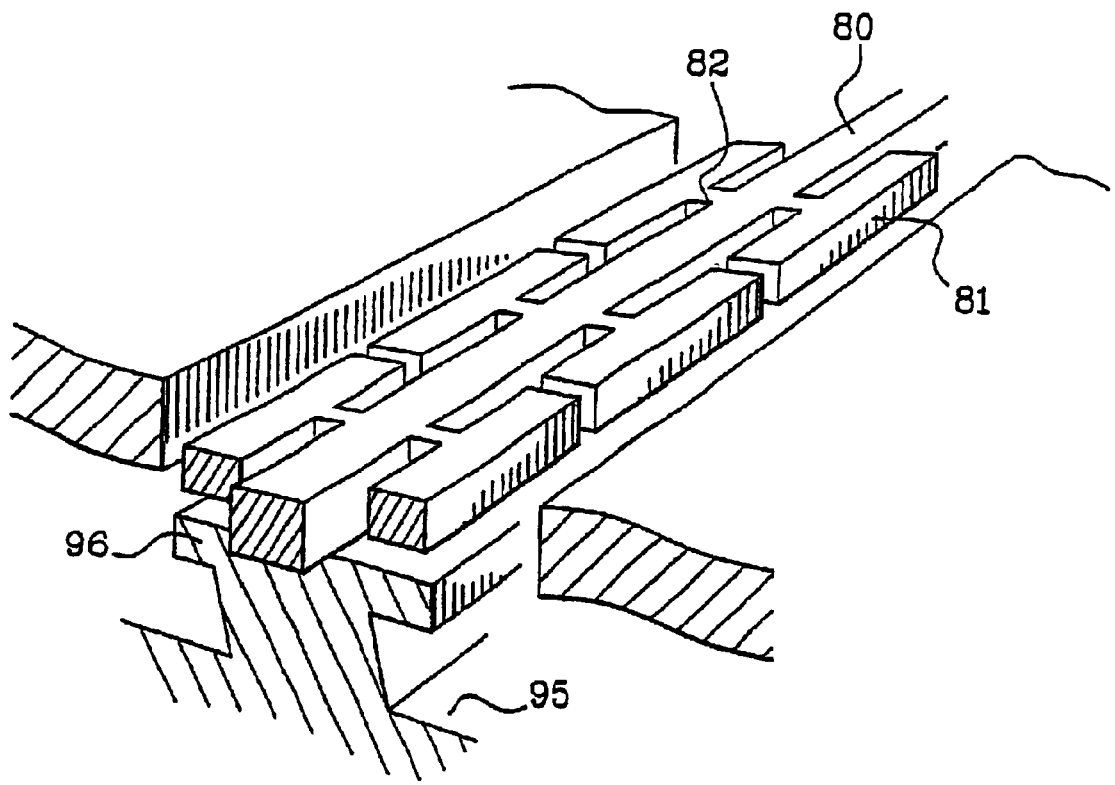
FIG. 8 is a summary perspective view of the region of FIG. 7.

The small dimensions of the regions (82) joining the small protection beams (81) to the beam (80) of the return means, as illustrated in FIG. 8, mean that the overall stiffness of the assembly is determined solely by the stiffness of the beam (80). The small protection beams (81) act as weights, but their cross section hardly affects the determination of the stiffness properties of the beam (80).

Figure 9:
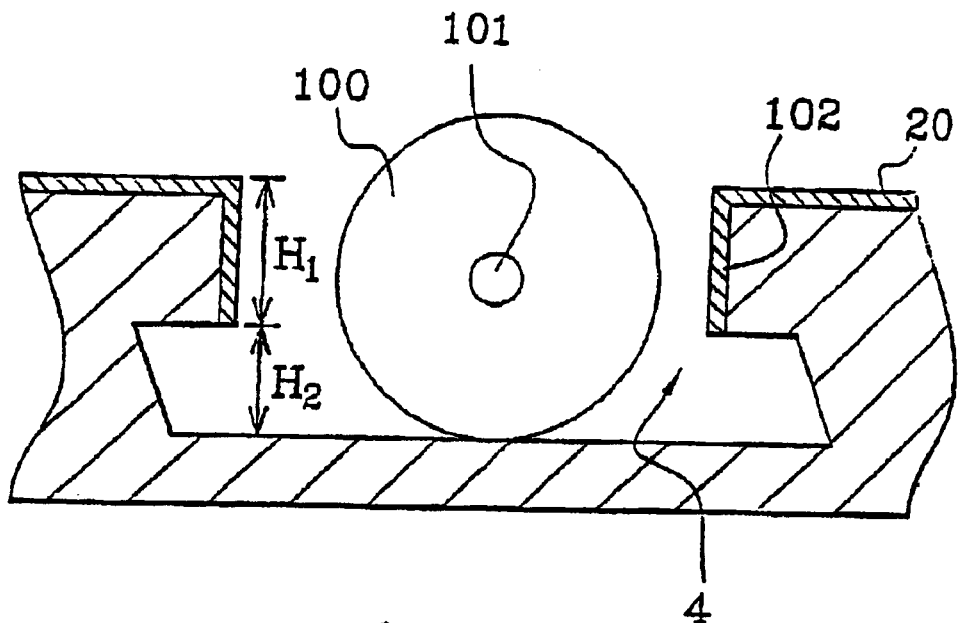
FIGS. 9 and 10 are cross-sectional views of two propagation guides produced according to two embodiment variants.

As regards the depth of the propagation guides, several situations may be envisaged. Thus, as illustrated in FIG. 9, the first dry etching step may define a relatively limited height $H_1$ of around 10 to 100 microns. This height $H_1$ will define the height of the reflecting mirror (6). The second wet etching step defines the depth of the guide (4) with respect to the upper face of the substrate (20).

Both the heights $H_1$ and $H_2$ may be chosen in such a way that the centre (101) of the beam output by the optical fibre (100) lies level with the centre of the mirror, the position of which corresponds approximately to the side wall (102) of the guide (4). In this case, since reflection takes place in the upper part of the mirror, the reflecting properties and the planarity are completely controlled, giving optimum optical behaviour.

Figure 10:
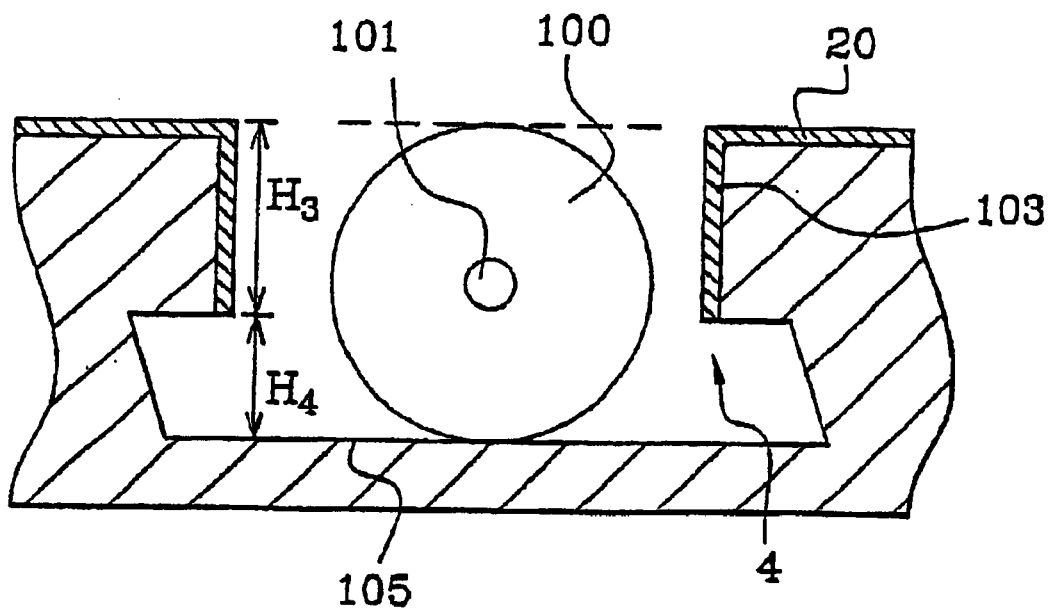

In another situation, illustrated in FIG. 10, the depth $H_3$ of the first dry etching step is greater than the value $H_1$ illustrated in FIG. 9, and typically around 60 to 100 microns. In this case, the centre of the beam (101) output by the fibre (100) is reflected at a lower level of the mirror, corresponding to the side wall (103) of the propagation guide (4). The reflection properties are therefore slightly inferior to those of the embodiment illustrated in FIG. 9. On the other hand, thanks to the second deep etching step, carried out to a depth $H_4$, the bottom (105) of the guide (4) lies away from the plane (20) of the upper face of the substrate by a distance greater than or equal to the diameter of the optical fibres (100). In this case, the fibres (100) do not project from the upper plane (20) of the substrate, thereby facilitating the encapsulation operations.

Of course, the various explanations given as regards the design of an optical switch may be transposed to the production of a variable attenuator or obturator. In this case, the orientation of the wall bearing the mirror with respect to the propagation guide may be different. These elementary cells may also be arranged in order to form matrices of switches, obturators or attenuators.

It stems from the foregoing that the optical components produced according to the process of the invention have many advantages and especially:

a optimization of the movement of the mirror, since the return means are dimensioned with a depth independent of that of the electrodes, thereby making it possible, on the one hand, to reduce the stiffness of these return means and to increase the electrostatic force;

optimization of the energy consumption of the actuator, because of the increase in the height of the electrodes;

reduction in the silicon surface occupation of such a microcomponent, which therefore permits multiple components such as matrices of switches to be produced;

a production process consisting of a limited number of steps; and the possibility of suitably choosing the position of the optical fibres in the propagation guides.

What is claimed is:

1. A process for fabricating a microelectromechanical optical component from a silicon substrate, wherein the microelectromechanical optical component comprises:

at least two optical propagation guides, especially intended to receive optical fibres;

a moving wall which can move with respect to the propagation guides;

an electrostatic actuator capable of causing the moving wall to move with respect to the substrate, wherein the actuator comprises:

a plurality of first and second facing electrodes, wherein the plurality of first electrodes can move with respect to the plurality of second electrodes, wherein the plurality of second electrodes is mechanically linked to the moving wall, and the plurality of first electrodes is fastened to the substrate; and return means formed by at least one beam produced in the substrate and opposing the movement of the electrodes with respect to one another; characterized in that:

the substrate used is made of single-crystal silicon, the (111) planes of which are parallel to the plane of the substrate;

wherein the method comprises the steps of:

A) performing a series of deep reactive ion etching steps on the substrate to define a height ($h_1$) of the moving wall, a height ($h_2$) of the plurality of first and second electrodes of the actuator, and a height ($h_3$) of the at least one beam of the return means of the actuator, wherein the values of $h_1$, $h_2$, and $h_3$ each differ; followed by (B) wet etching the deep reactive ion etched substrate to free the moving wall, the plurality of first and second electrodes, and the at least one beam from the substrate.

2. The process according to claim 1, further comprising, before step (A) the step of masking the substrate to define the subsequent positions of the optical propagation guides, of the moving wall, of the electrodes, and of the return means of the actuator.

3. The process according to claim 1, wherein the series comprises two successive deep reactive ion etching steps comprising:

(i) a first deep reactive ion etching of the substrate during which the heights ($h_1$, $h_2$, and $h_3$) of the moving wall, of the electrodes and of the return means of the actuator are defined; and (ii) a second deep reactive ion etching of each region produced from the first deep reactive ion etching of the substrate to define the volumes from which the subsequent wet etching step (B) may be initiated.

4. The process according to claim 3, further comprising between the two deep reactive ion etching steps (i) and (ii), the steps of:

(a) depositing a conformal layer of $SiO_2$ onto the initially etched regions of the substrate; and (b) removing the $SiO_2$ layer deposited onto the bottom of each of the initially etched regions.

5. The process according to claim 1, characterized in that, during step (A), a plurality of small protection beams, located on each side of the at least one beam of the return means of the actuator, is defined, wherein the small protection beams are joined to the at least one beam of the return means via a plurality of corresponding linking portions each having a small dimension, and wherein the small protection beams are freed from the substrate during the wet etching step (B).

6. The process according to claim 1, further comprising after the wet etching step (B), the step of metallizing the upper face of the substrate and the side walls produced during step (A).

* * * * *